United States Patent [19]

Caldwell

[11] 3,952,760

[45] Apr. 27, 1976

[54] MULTIPLE LOW PRESSURE SELECTOR RELAY AND METHOD OF MAKING THE SAME

[75] Inventor: Edward N. Caldwell, Knoxville, Tenn.

[73] Assignee: Robertshaw Controls Company, Richmond, Va.

[22] Filed: Aug. 25, 1975

[21] Appl. No.: 607,354

[52] U.S. Cl. .................................... 137/82; 137/608
[51] Int. Cl.[2] .......................................... G05D 11/58
[58] Field of Search ............ 137/82, 85, 608, 612.1; 235/201 ME

[56] References Cited

UNITED STATES PATENTS

| | | | |
|---|---|---|---|
| 3,223,105 | 12/1965 | Hogel | 137/85 |
| 3,602,246 | 8/1971 | Hettinger | 137/608 |
| 3,785,403 | 1/1974 | Kirk | 137/608 |

*Primary Examiner*—Alan Cohan
*Attorney, Agent, or Firm*—Candor, Candor & Tassone

[57] ABSTRACT

A multiple low pressure selector relay having a housing provided with a plurality of low pressure relays each having an exhaust port. A movable selector is carried by the housing and has means for closing all of the exhaust ports except two thereof when the selector is in one position thereof, the selector having the means thereof opening other of the exhaust ports when the selector is moved to other positions thereof whereby the desired number of exhaust ports in addition to the two thereof can be opened.

11 Claims, 14 Drawing Figures

MULTIPLE LOW PRESSURE SELECTOR RELAY AND METHOD OF MAKING THE SAME

This invention relates to an improved multiple low pressure selector relay and to a method of making the same.

It is well known that multiple high-low pressure selector relays have been provided wherein each receives a multiplicity of signals and in turn generates two outputs, one equivalent to the highest pressure received and the other being equivalent to the lowest pressure received.

However, it has been found that when these prior known multiple high-low pressure selector relays are utilized with less than the total number of input signals therefor, each selector relay must have one signal thereof piped to all the unused low pressure modules thereof or zero pressure will be generated for the low output.

According to the teachings of this invention, however, an improved pressure selector relay is provided wherein the need of expensive field piping is eliminated as the improved selector means thereof permits a simple selection of the total number of low pressure relay modules that are desired to be utilized.

Accordingly, it is a feature of this invention to provide an improved multiple low pressure selector relay having selector means for selecting the desired number of relay modules to be utilized without requiring piping of one of the signals to all of the unused low pressure relay modules.

In particular, one embodiment of this invention provides a multiple low pressure selector relay having a housing means provided with a plurality of low pressure relays each having an exhaust port. A movable selector means is carried by the housing means and has means for closing all of the exhaust ports except two thereof when the selector means is in one position thereof, the selector means having the means thereof opening other of said exhaust ports when the selector means is moved to other positions thereof whereby the desired number of exhaust ports in addition to the two thereof can be opened.

Accordingly, it is an object of this invention to provide an improved multiple low pressure selector relay having one or more of the novel features set forth above or hereinafter shown or described.

Another object of this invention is to provide an improved method of making such a multiple low pressure selector relay, the method of this invention having one or more of the novel features set forth above or hereinafter shown or described.

Other objects, uses and advantages of this invention are apparent from a reading of this description which proceeds with reference to the accompanying drawings forming a part thereof and wherein.

Figure 5B:
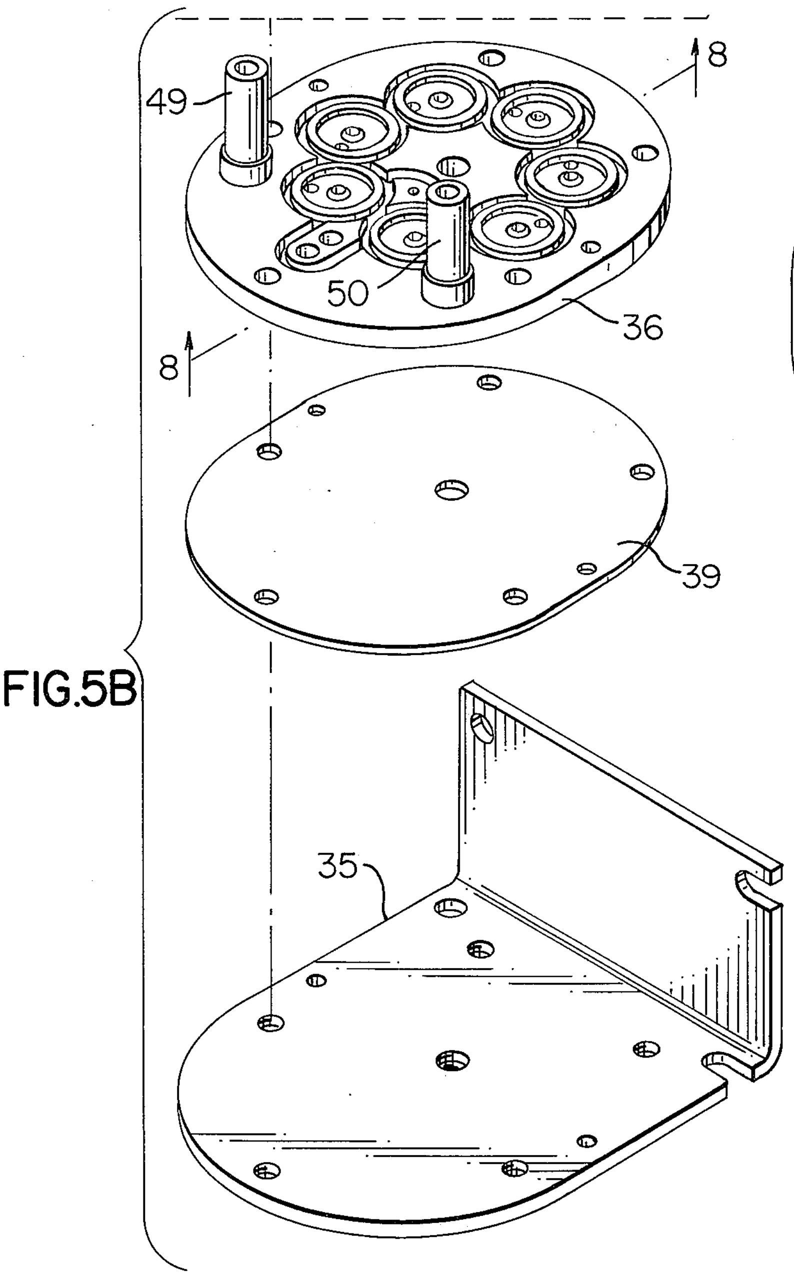
Figure 5A:
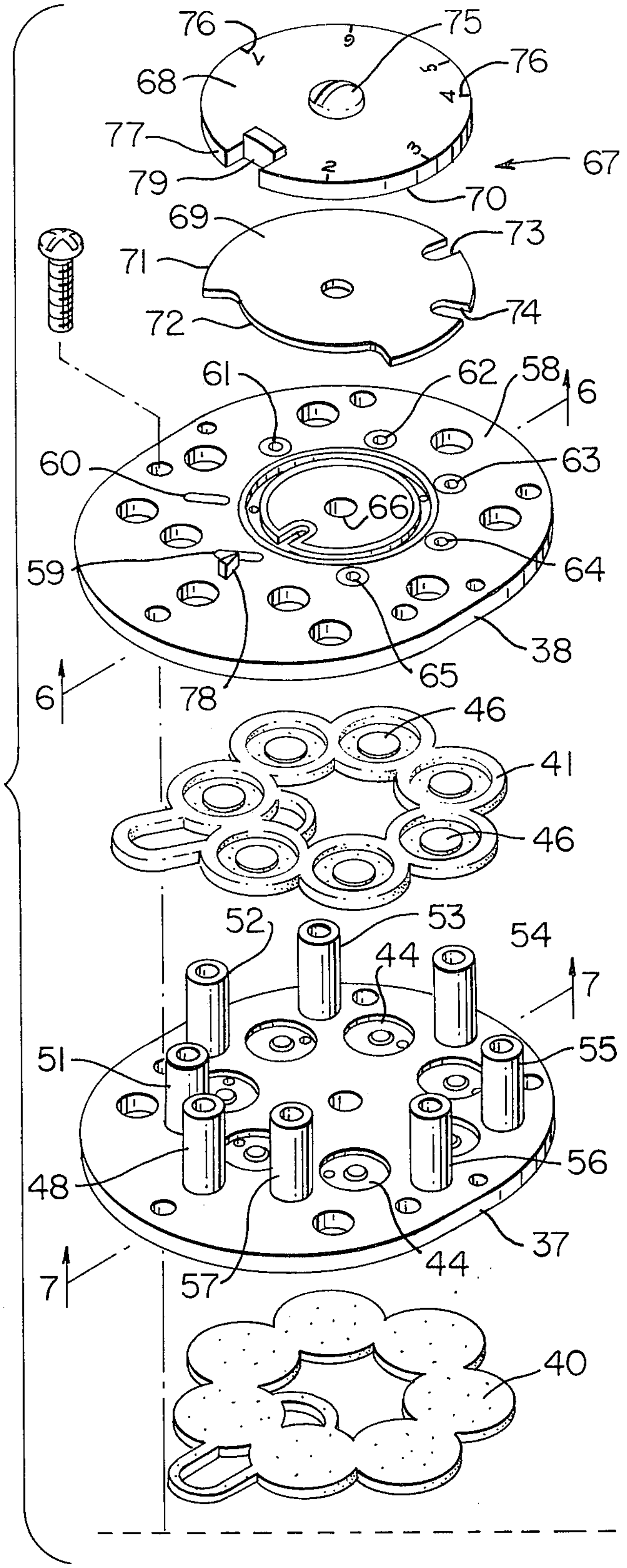

FIGS. 5A and 5B when placed together at the dashed lines 14 and 15 thereof illustrate the relay of this invention in an exploded perspective view thereof.

Figure 6:
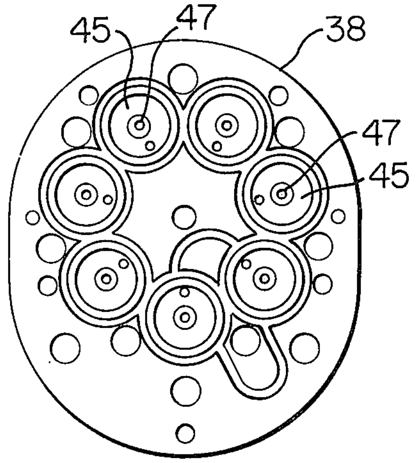

FIG. 6 is the back side of the plate of FIG. 5A taken in the direction of the arrows 6—6 thereof.

Figure 7:
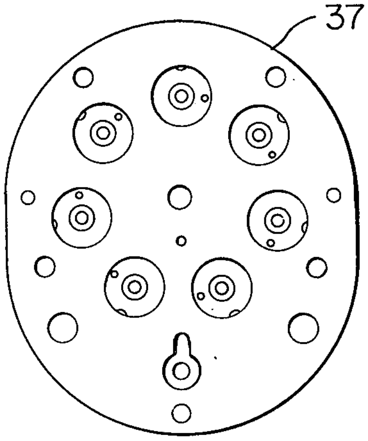

FIG. 7 is the back side of the plate of FIG. 5A taken in the direction of the arrows 7—7 thereof.

Figure 8:
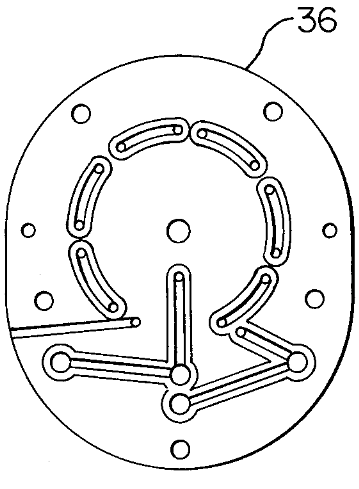

FIG. 8 is the back side of the plate of FIG. 5B taken in the direction of the arrows 8—8 thereof.

Figure 3:
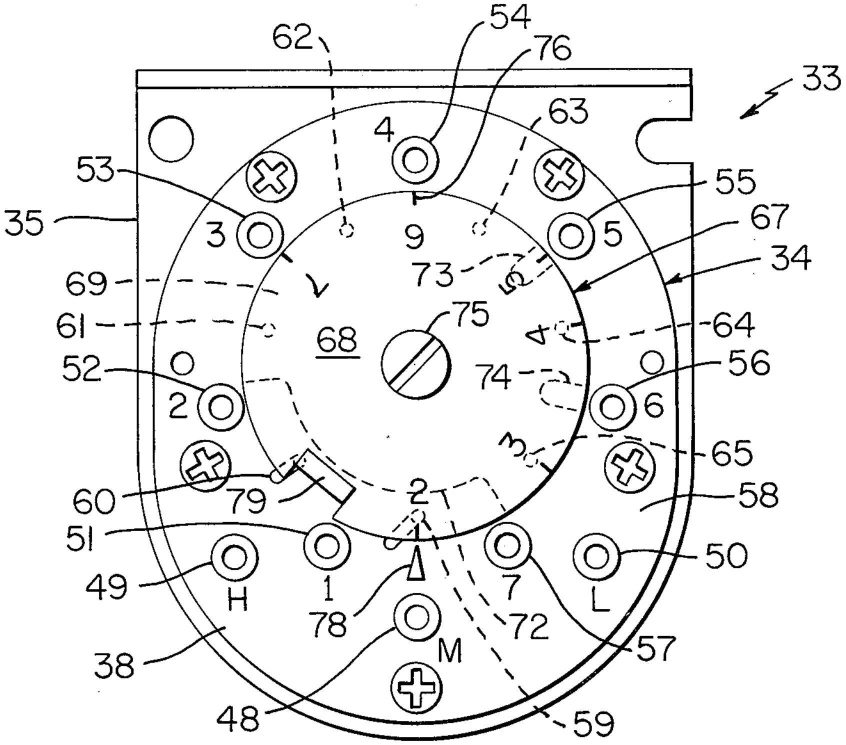
FIG. 3 is a view taken in the direction of the arrows 3—3 of FIG. 2.
Figure 9:
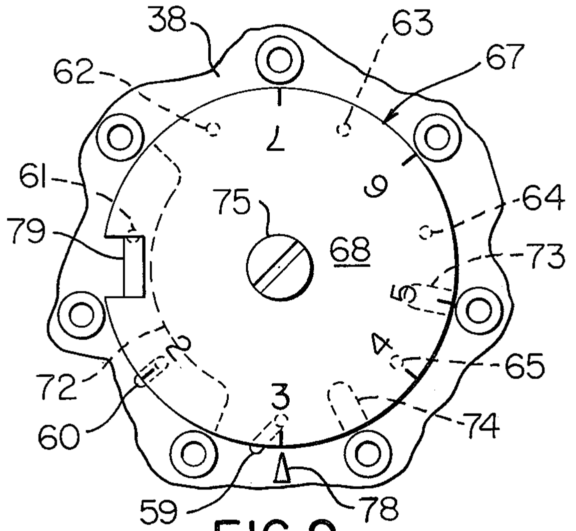

FIG. 9 is a view similar to FIG. 3 and illustrates the selector relay set for utilizing three signals.

Figure 10:
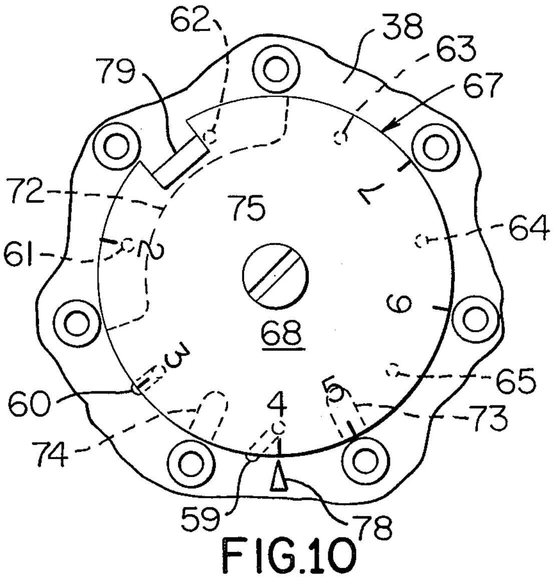

FIG. 10 is a view similar to FIG. 9 and illustrates the relay set for receiving four signals.

Figure 11:
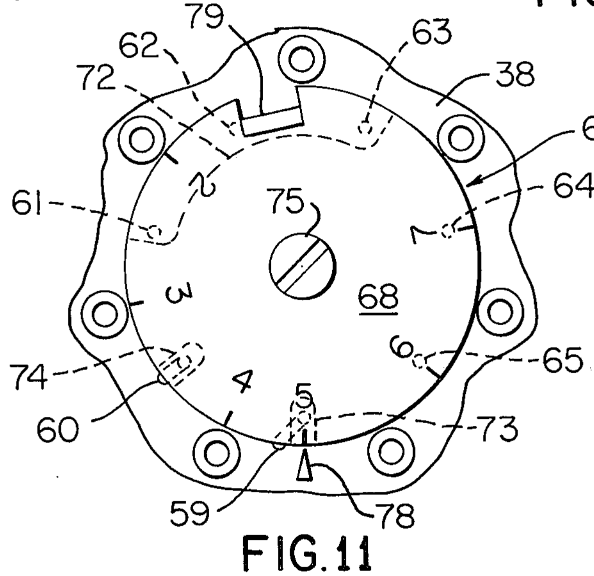

FIG. 11 is a view similar to FIG. 9 and illustrates the relay set for receiving five signals.

Figure 12:
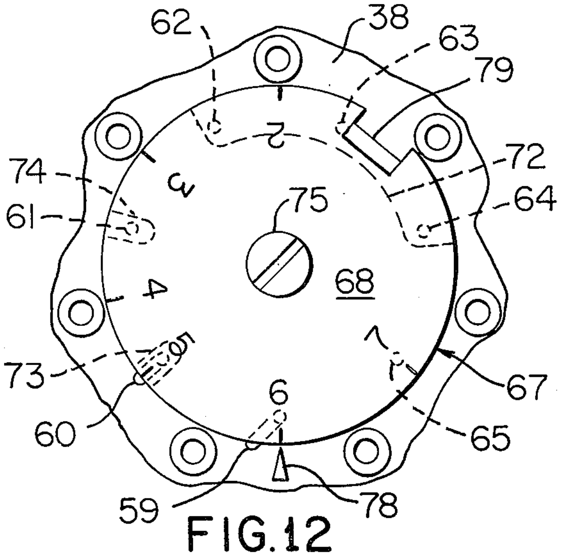

FIG. 12 is a view similar to FIG. 9 and illustrates the relay set for receiving six signals.

Figure 13:
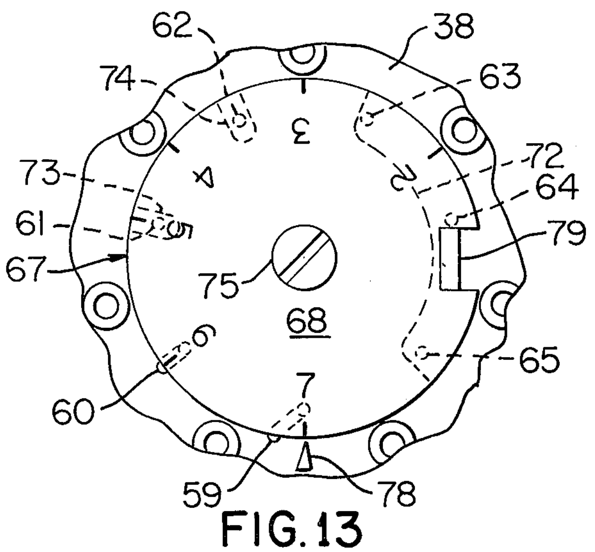

FIG. 13 is a view similar to FIG. 9 and illustrates the relay set for receiving seven signals.

While the various features of this invention are hereinafter described and illustrated as being particularly adapted to provide a multiple pressure selector relay adapted to receive a total of seven signals, it is to be understood that the various features of this invention can be utilized singly or in any combination thereof to provide a selector relay having any desired number of total signals to be received thereby.

Therefore, this invention is not to be limited to only the embodiment illustrated in the drawings, because the drawings are merely utilized to illustrate one of the wide variety of uses of this invention.

Figure 1:
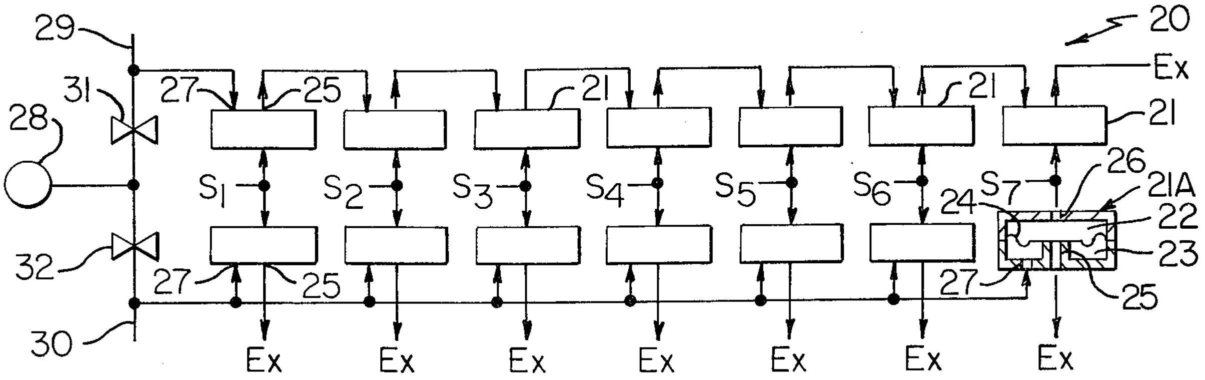
FIG.1 PRIOR ART
FIG. 1 is a schematic view illustrating a prior art multiple high-low pressure selector relay.

Referring now to FIG. 1, a typical prior art multiple high-low pressure selector relay arrangement is generally indicated by the reference numeral 20 and comprises a plurality of individual pressure relay modules 21 each being substantially identical to the module 21A shown in cross section in FIG. 1 and being packaged together in a housing means in a manner well known in the art to be fluidly interconnected together as schematically illustrated.

Each relay module 21 includes a pair of chambers 22 and 23 separated from each other by a flexible diaphragm 24 that is adapted to open and close an exhaust port 25 thereof depending upon the pressure differential across the diaphragm 24. The chamber 22 has an inlet 26 for receiving a pressure signal and the chamber 23 has an inlet 27 for receiving a supply pressure from a supply source 28.

The prior art multiple high-low pressure selector relay 20 of FIG. 1 includes an upper row of seven relay modules 21 for providing an output of the highest signal pressure being directed thereto from seven signal sources S1, S2, S3, S4, S5, S6 and S7 while seven relay modules 21 are provided in a lower row thereof for providing an output of the lowest of the seven signals S1 – S7 respectively interconnected to the inlet ports 26 thereof. The selector relay 20 has a high output port 29 and a low pressure output port 30 whereby the pressure at the output port 29 represents the highest pressure of the signals S1 – S7 and the output port 30 represents the lowest pressure of the signal pressures S1 – S7, the supply pressure 28 being directed to the outputs 29 and 30 through respective restrictors 31 and 32.

The output port 29 of the relay 20 is connected to the inlet 27 of the first relay 21 in the high pressure row thereof while the exhaust port 25 thereof is interconnected to the inlet 27 of the next adjacent relay 21 in the row thereof with all of the relays 21 in the upper row being interconnected as indicated. Similarly, the low output 30 of the relay 20 is interconnected to the inlets 27 of all of the relays 21 in the lower row thereof while all of the exhaust ports 25 thereof are adapted to be interconnected to the atmosphere.

However, should it be desired to utilize the relay 20 of the prior art for only receiving signals S1 – S4, one of the signals S1 – S4 must be interconnected to the inlets 26 of the last three relay modules 21 to the right of FIG. 1 or the output being produced at the low pressure output 30 will be zero and thus, not the lowest output of the signals S1 – S4 as desired.

Therefore, it can be seen that it requires an expensive piping operation to make sure that the unused relays in the low pressure side of the relay 20 have a signal piped thereto from one of the used relay modules thereof.

However, as previously stated, it is one of the features of this invention to provide a multiple pressure selector relay wherein the piping of signals from one of the used relays thereof to the unused relays thereof is completely eliminated as the number of the relays thereof to be utilized can be readily selected by movement of a simple selector means of the relay construction to the designated number of relays to be utilized.

Figure 2:
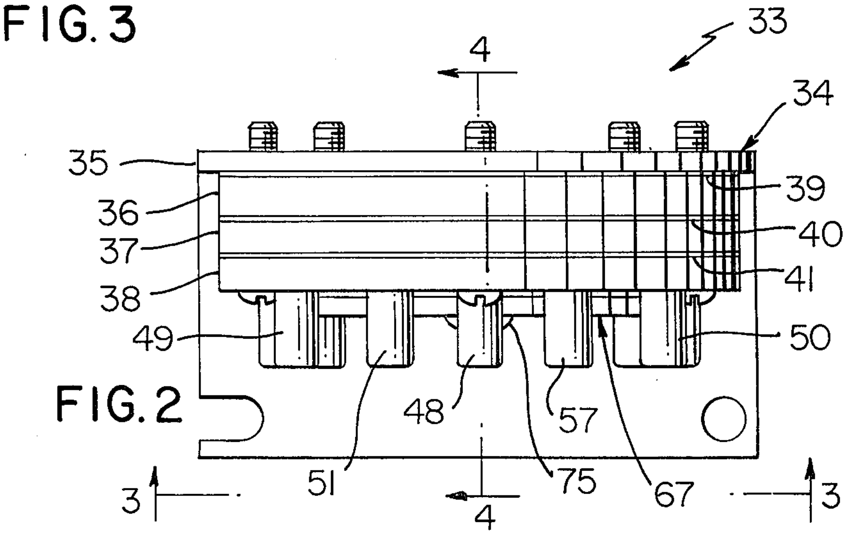
FIG. 2 is a side view of the improved multiple high-low pressure selector relay of this invention.
Figure 4:
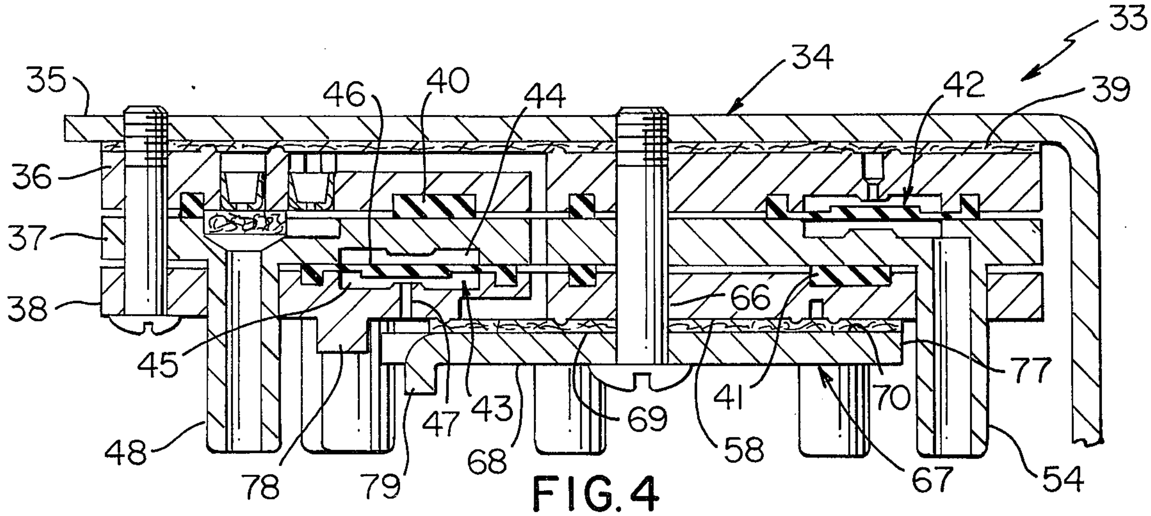
FIG. 4 is an enlarged cross-sectional view taken on line 4—4 of FIG. 2.

In particular, the improved multiple pressure selector relay of this invention is generally indicated by the reference numeral 33 in FIGS. 2–3 and comprises a housing means that is generally indicated by the reference numeral 34 and formed by a plurality of housing plates 35, 36, 37 and 38 disposed in stacked relation with suitable gasket means 39, 40 and 41 disposed therebetween with the parts 35–41 being ported and formed in the manner illustrated in FIGS. 5A, 5B and 6–8 so as to provide seven high pressure relay modules that are generally indicated by the reference numeral 42 in FIG. 4 between the plates 36 and 37 and seven low pressure relay modules generally indicated by the reference numeral 43 in FIG. 4 between the plates 37 and 38.

Since the improved selector means of this invention hereinafter described can be utilized with a multiple selector relay having only low pressure relay modules 43, only the relay modules 43 of the relay 33 will be hereinafter described even though it can readily be seen that the relay 33 of this invention is a multiple high-low pressure selector relay for providing as an output the highest and lowest pressure of multiple signals as will be apparent hereinafter.

As illustrated in FIG. 4, each low pressure relay module 43 includes the pair of chambers 44 and 45 separated from each other by a flexible diaphragm 46 that is adapted to open and close an exhause port 47 thereof depending upon the pressure differential across the diaphragm 46, the chambers 45 of the relays 43 being interconnected to the supply source and the chambers 44 thereof being respectively interconnected to the pressure signals.

For example, it can readily be seen in FIG. 3 that a pressure source nipple 48 is provided for the housing means 34 while high and low output nipples 49 and 50 are also provided for the housing means 34. In addition, signal input nipples 51, 52, 53, 54, 55, 56 and 57 are provided for the housing means 34 and are respectively indicated as signal inports 1–7 on the plate 38 for a purpose hereinafter described.

Each low pressure relay module 43 has its exhaust port 47 interrupting the surface 58 of the plate 38 with the exhaust ports 47 for the seven low pressure relay modules of one through seven being respectively indicated by the reference numerals 59–65, the exhaust ports 61–65 being identical and being disposed substantially in a circular array about a center opening 66 of the plate 38 while the exhaust ports 59 and 60 for the numbers one and two relay modules 43 comprise angled elongated slots in the surface 58 of the plate 38 for a purpose hereinafter described.

A selector means for the relay 34 of this invention is generally indicated by the reference numeral 67 in FIG. 5A and comprises a selector plate 68 having a sealing gasket-like member 69 adhesively secured to the undersurface 70 thereof, the gasket member 69 having an outer substantially circular periphery 71 interrupted by a relatively long slot 72 and a pair of narrow slots 73 and 74 for a purpose hereinafter described.

The selector means 67 is rotatably mounted to the housing means 34 of the relay 33 in the opening 66 by fastening means 75, the selector plate 68 being suitably marked by markings 76 on the outer periphery 77 thereof to respectively indicate two, three, four, five, six and seven low pressure relay modules 43 for a purpose hereinafter described.

When the selector means 67 is rotatably mounted to the top plate 38 of the housing means 34 in the manner illustrated in FIG. 3, it can be seen that the gasket member 69 of the selector means 67 is adapted to have its outer periphery 71 extend outwardly beyond the circular array of exhaust ports 61–65 while the angled slot exhaust ports 59 and 60 of the first and second low pressure relay modules 43 extend outwardly from the outer periphery 71 of the sealing gasket plate 69 so that at all times, the exhaust ports of the first and second low pressure relay modules 43 are interconnected to the atmosphere.

An indicating pointer means 78 is carried on the plate 38 of the housing means 34 to cooperate with the selector means 67 for permitting an operator to select the desired number of low pressure relay modules 43 with which the relay 33 is to measure the lowest pressure signal thereof.

In particular, the operation of the multiple high-low pressure selector relay 33 of this invention will now be described.

With the relay 33 of this invention disposed in a pressure system wherein a fluid pressure source is interconnected to the inlet 48 and means for measuring the high and low outputs are respectively interconnected to the outlet nipples 49 and 50, the relay 33 of this invention can be utilized for having any number of pressure signals interconnected thereto from two signals up to a total of seven signals because there is no reason to measure high and low outputs from only one signal and the relay 33 of this invention in the embodiment illustrated in the drawings is adapted to have a total of seven signals interconnected thereto by being respectively interconnected to the signal nipples 51–57 as illustrated.

However, by merely rotating the selector means 67 to the desired number of signals to be utilized with the relay 33, the relay 33 can be utilized without interconnecting one of the used signals to the non-used low pressure modules 43 as required in the prior art relay 20 of FIG. 1.

In particular, it can readily be seen in FIG. 3 that when the selector means 67 is set for measuring two signals as illustrated in FIG. 3, the first and second low pressure relay modules 43 have the exhaust ports 59 and 60 thereof interconnected to the atmosphere as the same are outboard of the outer periphery 71 of the sealing plate 69 of the selector means 67 while the sealing plate 69 completely covers and seals the outlet ports 61-65 of the third through seventh low pressure relay module 43 whereby the signal pressures S1 and S2 will be respectively interconnected to the inlet nipples 51 and 52 and the highest of the two signals will be produced at the output port 49 and the lowest of the two signals will be produced at the output port 50 in the same manner as provided by the prior art relay 20 of FIG. 1 except that neither signal at port 51 and 52 need be piped to the third through seventh low pressure relay module as in the prior art relay 20 of FIG. 1 since the selector means 67 of this invention completely closes the exhaust ports 61–65 thereof as illustrated in FIG. 3.

However, if the operator desires to utilize the relay 33 for measuring the high-low output of three signals, four signals, five signals, six signals, or seven signals, the selector means 67 is merely rotated by the operator loosening the fastening means 75 and grasping an upwardly bent tongue or tab 79 of the selector means 67 and rotating the plate 68 until the desired number 2–7 thereon is opposite the pointer 78 on the plate 38 as represented respectively in FIG. 9–13 whereby it can be seen that when the desired number of relay modules 43 are selected by the selector means 67, that number of selector means beginning with one through the selected number all have their exhaust ports exposed through the slot means 72, 73 or 74 in the sealing plate 69 while the remaining unselected exhaust ports will be sealed by the gasket 69.

Thus, in FIG. 9 where three low pressure relay modules 43 are selected, the exhaust port 61 in addition to the first two exhaust ports 59 and 60 is now interconnected to the atmosphere through the slot 72 of the plate 69 while the exhaust ports 62–65 of the fourth through seventh low pressure relay modules 43 are sealed closed by the plate 69. In FIG. 10 where the first four low pressure modules 43 are selected by the selector means 67, the exhaust ports 61 and 62 are exposed to the atmosphere by the slot 72 of the plate 69 in addition to the first two exhaust ports 59 and 60 while the exhaust ports 63–65 of the fourth through seventh relay modules 43 are sealed closed by the plate 69.

As illustrated in FIG. 11 where the selector means 67 is set for utilizing the first five low pressure relay modules 43, it can be seen that the slot 72 in the gasket 69 of the selector means 67 exposes the exhaust ports 61–63 of the third through fifth relay modules 43 to the atmosphere in addition to the first two exhaust ports 59 and 60 while the plate 69 seal closes the exhaust ports 64 and 65 of the sixth and seventh relay modules 43.

When the selector means 67 is set for selecting six relay modules 43 as illustrated in FIG. 12, it can be seen that the slot 74 in the plate gasket 69 of the selector means 67 now exposes the exhaust port 61 of the third relay module 43 to the atmosphere while the slot 72 thereof exposes the exhaust ports 62–64 of the fourth through sixth relay modules 43 to the atmosphere while sealing closed the exhaust port 65 of the seventh relay module 43.

When all seven relay modules 43 of the relay 33 are selected by the selector means 67 as illustrated in FIG. 13, it can be seen that the exhaust ports 61 and 62 of the third and fourth relay modules 43 are respectively interconnected to the atmosphere by the slots 74 and 73 of the gasket member 69 while the slot 72 exposes the exhaust ports 63–65 of the fifth through seventh relay modules 43 to the atmosphere.

Accordingly, it can be seen that by merely turning the selector means 67 to the desired number of signals to be utilized for the relay 33, the exhaust ports of the unused relay modules 43 on the low pressure side of the selector relay 33 will be covered and closed by the gasket 69 and the desired number of usable relay modules 43 will have the exhaust ports thereof exposed to the atmosphere whereby the selector means 67 simply and effectively selects the desired number of low pressure relay modules 43 to be utilized for the high-low pressure selector relay 33 of this invention.

Thus, it can be seen that this invention not only provides an improved multiple pressure selector relay, but also this invention provides an improved method of making such a relay or the like.

While the form and method of this invention now preferred have been described and illustrated as required by the Patent Statute, it is to be understood that other forms and method steps can be utilized and still fall within the scope of the appended claims.

What is claimed is:

1. In a multiple low pressure selector relay having a housing means provided with a plurality of low pressure relays each having an exhaust port, the improvement comprising movable selector means carried by said housing means and having means for closing all of said exhaust ports except two thereof when said selector means is in one position thereof, said selector means having said means opening other of said exhaust ports when said selector means is moved to other positions thereof whereby the desired number of exhaust ports in addition to said two thereof can be opened.

2. In a multiple low pressure selector relay as set forth in claim 1, said means of said selector means serially opening the other exhaust ports as said selector means is moved relative to said housing means in one direction.

3. In a multiple low pressure selector relay as set forth in claim 2, said means of said selector means covering said other exhaust ports when closing the same and uncovering said other exhaust ports when opening the same.

4. In a multiple low pressure selector relay as set forth in claim 3, said means of said selector means being slidable relative to said other exhaust ports to cover and uncover the same.

5. In a multiple low pressure selector relay as set forth in claim 2, said selector means being rotatable relative to said housing means whereby said selector means is rotated between said positions thereof.

6. In a multiple low pressure selector relay as set forth in claim 5, said means of said selector means covering said other exhaust ports when closing the same and uncovering said other exhaust ports when opening the same.

7. In a multiple low pressure selector relay as set forth in claim 6, said means of said selector means being slidable relative to said other exhaust ports to cover and uncover the same as said selector means is rotated relative to said housing means.

8. In a multiple low pressure selector relay as set forth in claim 7, said housing means having said exhaust ports disposed in substantially a circular array.

9. In a multiple low pressure selector relay as set forth in claim 8, said other of said exhaust ports having the outlet ends thereof disposed substantially in the same circle, said two exhaust ports thereof having the outlet ends thereof disposed in a circle concentric with and larger than said circle of said other exhaust ports.

10. In a multiple low pressure selector relay as set forth in claim 9, said means of said selector means comprising a disc-like gasket member having a substantially flat surface for engaging against said outlet ends of said other exhaust ports to close the same, said gasket member having slot means therein that lead to the outer periphery thereof and are adapted to be alighned with respective outlet ends of said other exhaust ports to uncover the same.

11. In a multiple low pressure selector relay as set forth in claim 10, said outlet ends of said two exhaust ports being disposed outboard of said outer periphery of said gasket member in all rotational positions of said selector means.

* * * * *